April 15, 1947. J. H. BENSON 2,418,919
COMBINED DRAWER AND RACK
Filed April 26, 1945 3 Sheets-Sheet 1

INVENTOR.
JOHN H. BENSON
BY
Barnes, Kisselle, Laughlin & Raisch
Attorneys

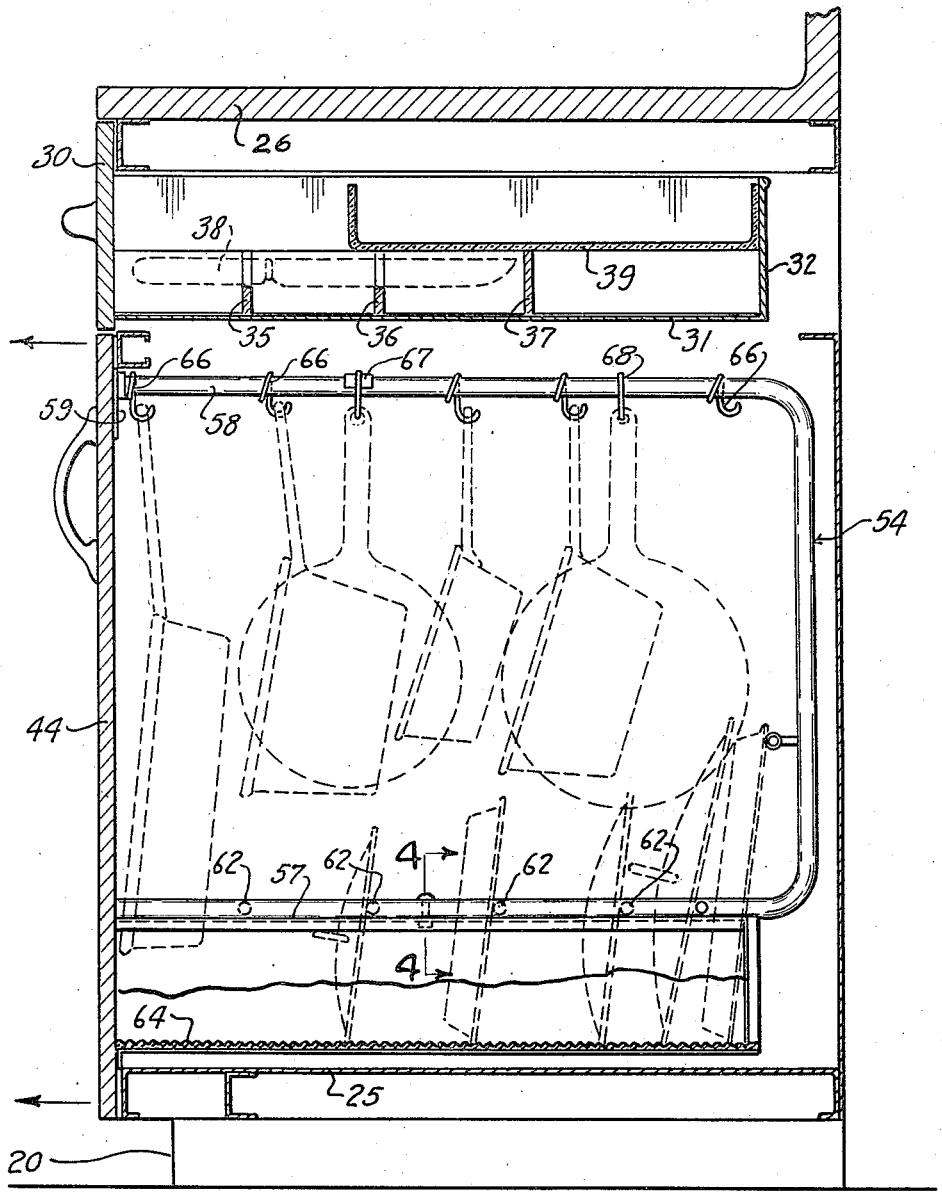

April 15, 1947.  J. H. BENSON  2,418,919
COMBINED DRAWER AND RACK
Filed April 26, 1945   3 Sheets-Sheet 3
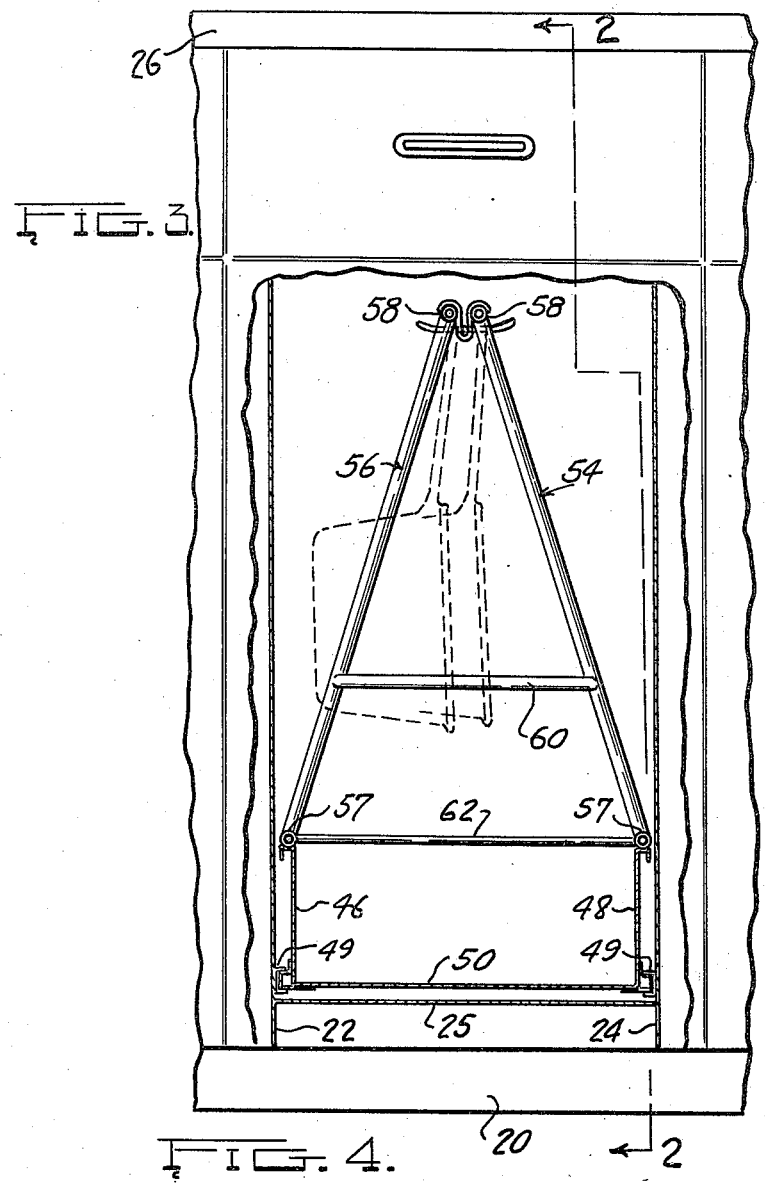
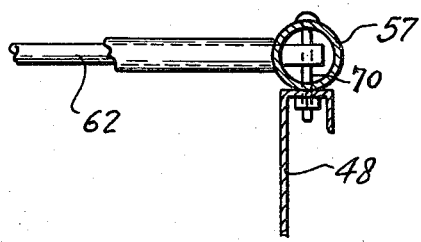
INVENTOR.
JOHN H BENSON
BY Patented Apr. 15, 1947

2,418,919

UNITED STATES PATENT OFFICE 2,418,919

COMBINED DRAWER AND RACK

John H. Benson, Salem, Ohio, assignor to Mullins Manufacturing Corporation, Salem, Ohio, a corporation of New York Application April 26, 1945, Serial No. 590,322

6 Claims. (Cl. 312—175)

1

This invention relates to a combined drawer and rack and has particularly to do with a storage compartment for kitchen utensils and cooking vessels.

It is an object of the present invention to provide a storage compartment which may be arranged along with other kitchen units under a common top and on a common base.

The main object of the invention is to provide for a standard cabinet with very little change, a storage compartment for kitchen cutlery and the like as well as a file cabinet for lids, pie plates, cake pans, etc., and in addition utilize the intervening space for most frequently used frying pans and other handle pans available for easy access at all times.

Other objects and features of the invention will be evident in the following description and appended claims.

In the drawings:

Fig. 2 is a sectional view of a kitchen unit with the storing devices closed.

Fig. 3 is a front view of the pan storage compartment with the panel broken away.

Fig. 4 is a section on line 4—4 of Fig. 2.

Figure 1:
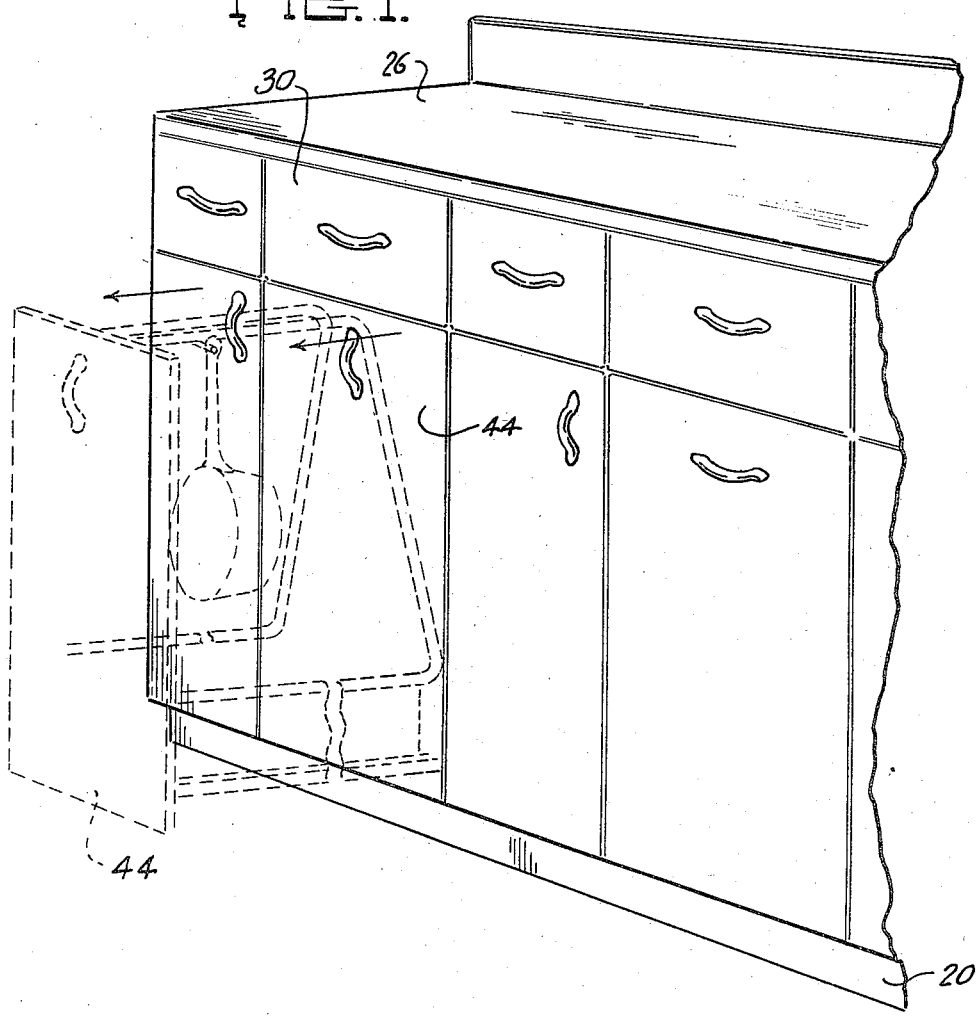
Fig. 1 illustrates a kitchen unit with the present device shown in dotted lines in open position.
Figure 5:
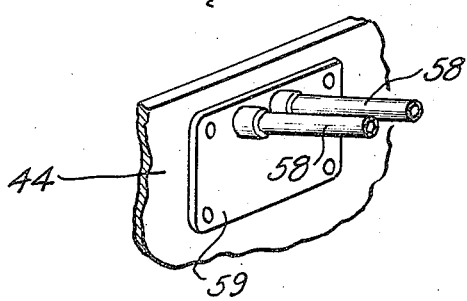
Fig. 5 illustrates the manner in which the pan rack is attached to the front panel of the drawer.

In the drawings a portion of a kitchen cabinet is shown with a base 20, vertical sides 22 and 24, a bottom 25 and a top 26.

Below the top 26 is a drawer having a drawer head 30, a bottom 31 and a back 32. The sides of the drawer are suitably mounted for sliding movement within the cabinet. Transverse partitions 35, 36 and 37 are mounted on the bottom of the drawer in parallel relation extending part way up the depth of the drawer. The partitions 35 and 36 are slotted to provide a storage space for knives 38. On top of the partitions is a transparent sliding tray 39 which slides over the knife rack and permits easy access to the knife rack when desired.

In the lower portion of the cabinet where shelves and swinging doors are usually provided a tall drawer head 44 is mounted on sides 46 and 48 slidably mounted in tracks 49 on the sides 22 and 24. A drawer bottom 50 joins with sides 46 and 48. Mounted on the drawer are two U-shaped tube or rod members 54 and 56. One leg 57 of the members is secured along the top edges of sides 46 and 48 as by bolts 70. The other legs 58 of the U-shaped members are

2 brought together at the top as shown in Fig. 3 where the ends are joined to the top of the head 44 by a bracket 59. A reinforcing cross bar 60 is provided at the back.

Spaced across the drawer between the legs 57 of the U-shaped members are rods 62 placed in parallel relation to serve as a space definer for covers, pie tins, cake tins and the like as shown in Fig. 2. In the bottom of the drawer a corrugated rubber mat 64 prevents slipping of the flat pieces. The rods 62 may be covered with rubber tubing to prevent noise (Fig. 4). Across the top of the assembly on legs 58 various hooks 66, 67 and 68 are provided for frying pans and other cooking utensils as shown in outline.

There is thus provided a readily accessible storage unit for the pans in everyday use making these pans available without stooping and bending. In addition the space is utilized to the utmost by providing the cover storage and the utensil drawer in combination.

What I claim is:

1. A pan and utensil storage unit for use in a kitchen cabinet which comprises a relatively high drawer head fronting a bottom and lower drawer sides, and two U-shaped members situated with one leg of each fastened to a drawer side, the base of the U-member at the back of the drawer, and the other legs fastened together in adjacent relation near the top of the drawer head, and means on said adjacent legs for supporting utensil handles to suspend the utensils in the space behind the head.

2. A pan and utensil storage unit for use in a kitchen cabinet which comprises a relatively high drawer head fronting a bottom and low drawer sides, and two U-shaped members situated with one leg of each fastened to a drawer side, the base of the U-member at the back of the drawer, and the other legs fastened in adjacent relation to the top portion of the drawer head, and means on said adjacent legs for supporting utensil handles to suspend the utensils in the space behind the head, and connecting bars between said lower leg members to define spaces for utensil covers, flat pans and the like.

3. A pan and utensil storage unit for use in a kitchen cabinet which comprises a relatively high drawer head fronting a bottom and low drawer sides, and two U-shaped members situated with one leg of each fastened to a drawer side, the base of the U-member at the back of the drawer, and the other legs fastened in adjacent relation to the top portion of the drawer head, and means on said adjacent legs for supporting utensil handles to suspend the utensils in the space behind the head, connecting bars between said lower leg members to define spaces for utensil covers, flat pans and the like, and a friction surface in the bottom of said drawers to provide support for said cover, pans, and the like.

4. A pan and utensil storage unit for use in a kitchen cabinet, comprising spaced parallel sliding members and frame members fastened to said spaced members cooperating to provide support means at a point considerably above said spaced members, and hooks on said members adjacent said support means to cooperate with handles of utensils to support the same above said sliding members, said frame members comprising U-shaped pieces with one leg of each U-shaped piece fastened along the edge of a sliding member, and means securing the ends of the other legs together.

5. A pan and utensil storage unit for use in a kitchen cabinet, comprising spaced parallel sliding members and frame members fastened to said spaced members cooperating to provide support means at a point considerably above said spaced members, and hooks on said members adjacent said support means to cooperate with handles of utensils to support the same above said sliding members, said frame members comprising U-shaped pieces with one leg of each U-shaped piece fastened along the edge of a sliding member, the other legs positioned adjacently above the sliding members, an upright head slidable with said sliding members, and means anchoring the ends of the top legs to said head.

6. A pan and utensil storage unit for use in a kitchen cabinet, comprising a front closure, spaced parallel sliding members secured to said front closure, two U-shaped members having one leg of each secured to a sliding member and the other legs secured to said front closure above said sliding members; said U-shaped members serving to support utensils and to rigidly support the front closure member with respect to said sliding members.

JOHN H. BENSON.

REFERENCES CITED

The following references are of record in the file of this patent:

UNITED STATES PATENTS

| Number | Name | Date |
|---|---|---|
| 922,820 | Spady | May 25, 1909 |
| 2,211,308 | Wyman, Sr. | Aug. 13, 1940 |